(12) United States Patent
Lin et al.

(10) Patent No.: US 12,266,360 B2
(45) Date of Patent: *Apr. 1, 2025

(54) SYSTEMS AND METHODS FOR DISTINGUISHING VALID VOICE COMMANDS FROM FALSE VOICE COMMANDS IN AN INTERACTIVE MEDIA GUIDANCE APPLICATION

(71) Applicant: Adeia Guides Inc., San Jose, CA (US)

(72) Inventors: Edison Lin, Los Altos Hills, CA (US); Rowena Young, Menlo Park, CA (US); Lauren Palmateer, San Francisco, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,836

(22) Filed: Nov. 2, 2023

(65) Prior Publication Data

US 2024/0062761 A1    Feb. 22, 2024

Related U.S. Application Data

(63) Continuation of application No. 18/080,873, filed on Dec. 14, 2022, now Pat. No. 11,854,549, which is a
(Continued)

(51) Int. Cl.
*G10L 15/02* (2006.01)
*G10L 15/20* (2006.01)
(Continued)

(52) U.S. Cl.
CPC .......... *G10L 15/22* (2013.01); *G10L 21/0316* (2013.01); *H04R 1/326* (2013.01); *G10L 2015/223* (2013.01)

(58) Field of Classification Search
CPC ......... G10L 2015/223; G10L 2015/088; G10L 2025/86; G10L 25/84; G10L 25/93
(Continued)

(56) References Cited

U.S. PATENT DOCUMENTS 6,239,794 B1    5/2001 Yuen et al.
6,564,378 B1    5/2003 Satterfield et al.
(Continued)

OTHER PUBLICATIONS

International Preliminary Report on Patentability PCT/US2016/067499 dated Jun. 25, 2019.
(Continued)

*Primary Examiner* — George C Monikang
(74) *Attorney, Agent, or Firm* — Haley Guiliano LLP

(57) ABSTRACT

Systems and methods for distinguishing valid voice commands from false voice commands in an interactive media guidance application. In some aspects, the interactive media guidance application receives, at a user device, a signature sound sequence. The interactive media guidance application determines, using control circuitry, based on the signature sound sequence, a threshold gain for the current location of the user device. The interactive media guidance application receives, at the user device, a voice command. The interactive media guidance application determines, using the control circuitry, based on the voice command, a gain for the voice command. The interactive media guidance application determines, using the control circuitry, whether the gain for the voice command is different from the threshold gain. Based on determining that the gain for the voice command is different from the threshold gain, the interactive media guidance application executes, using the control circuitry, the voice command.

18 Claims, 10 Drawing Sheets

Related U.S. Application Data continuation of application No. 16/467,733, filed as application No. PCT/US2016/067499 on Dec. 19, 2016, now Pat. No. 11,557,290.

(51) Int. Cl.
  *G10L 15/22* (2006.01)
  *G10L 21/0316* (2013.01)
  *H04R 1/32* (2006.01)

(58) Field of Classification Search
  USPC .................................... 704/231, 233, 234
  See application file for complete search history.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 9,047,857 B1 | 6/2015 | Barton |
| 11,557,290 B2 | 1/2023 | Lin et al. |
| 2002/0174430 A1 | 11/2002 | Ellis et al. |
| 2003/0179888 A1 | 9/2003 | Burnett et al. |
| 2005/0251827 A1 | 11/2005 | Ellis et al. |
| 2010/0153885 A1 | 6/2010 | Yates |
| 2012/0297284 A1 | 11/2012 | Matthews et al. |
| 2013/0080168 A1 | 3/2013 | Iida et al. |
| 2015/0161998 A1 | 6/2015 | Park et al. |
| 2015/0348548 A1 | 12/2015 | Piernot et al. |
| 2016/0267908 A1 | 9/2016 | Borjeson et al. |
| 2016/0301810 A1 | 10/2016 | Dimitroff et al. |
| 2018/0035223 A1 | 2/2018 | Vicinus et al. |
| 2023/0223020 A1 | 6/2023 | Lin et al. |

OTHER PUBLICATIONS

International Search Report and Written Opinion of PCT/US2016/067499 dated Mar. 21, 2017.

SYSTEMS AND METHODS FOR DISTINGUISHING VALID VOICE COMMANDS FROM FALSE VOICE COMMANDS IN AN INTERACTIVE MEDIA GUIDANCE APPLICATION

CROSS REFERENCE TO RELATED APPLICATIONS

This application is a continuation of U.S. patent application Ser. No. 18/080,873, filed Dec. 14, 2022, which is a continuation of U.S. patent application Ser. No. 16/467,733, filed Jun. 7, 2019, now U.S. Pat. No. 11,557,290, which is a national stage application under 35 U.S.C. § 371 of International Application PCT/US2016/067499, filed Dec. 19, 2016, the disclosures of which are hereby incorporated by reference herein in their entireties.

BACKGROUND

User devices with voice recognition interfaces are becoming ever more common. For example, a user may utilize a voice recognition interface included in a set-top box to control an interactive media guidance application implemented on the set-top box. However, these voice-controlled user devices are sometimes unable to distinguish the user's valid voice commands from false voice commands (e.g., sounds from a radio or a television speaker). For example, the user device may execute a false voice command received from the television speaker, e.g., "change that channel," and cause a channel change even though the user had not requested, and did not expect, the channel change. Additionally, the user device may unknowingly ignore the user's valid voice command, e.g., "lower volume," if the user were to speak around the same time as the false voice command was received from the television speaker. In this example, the user would be utterly perplexed as to how his or her voice command to "lower volume" resulted in the user device changing the channel.

SUMMARY

Systems and methods are described to address shortcomings in conventional systems, such as user devices with voice recognition interfaces. Conventional systems are sometimes unable to distinguish between valid voice commands received from the user and false voice commands received from another source, e.g., a speaker connected to the user device. The systems and methods described herein provide for an interactive media guidance application that can distinguish between valid voice commands and false voice commands. The interactive media guidance application may be executed on control circuitry, e.g., control circuitry of the user device or another suitable device. The interactive media guidance application may determine a threshold metric based on a signature sound sequence played through a speaker or another suitable device connected to the user device. The threshold metric may be an indication of a false voice command generated from the speaker of the user device.

On receiving a voice command, the interactive media guidance application may determine another metric for the voice command and compare it to the threshold metric. If the metrics are determined to be the same or close in value (e.g., within a certain threshold), the interactive media guidance application may determine the voice command to be a false voice command generated from the speaker at the current location of the user device. If the metrics are determined to be different (e.g., differing by more than a certain threshold), the interactive media guidance application may determine the voice command to be a valid voice command received from a user. This is because the metrics being different may be an indication of a valid voice command received from a location other than the speaker of the user device.

In some aspects, the interactive media guidance application may generate a signature sound sequence for playback on, e.g., a speaker connected to a user device. For example, the signature sound sequence may be outside the audible frequency for human ears, i.e., below 20 Hz or above 20 KHz. In some embodiments, the signature sound sequence is generated during a setup sequence. In some embodiments, the signature sound sequence is generated periodically during operation of the user device. When a microphone connected to the user device receives the signature sound sequence, the interactive media guidance application may determine a threshold gain for the current location of the user device based on the gain of the microphone. When the microphone connected to the user device receives a voice command from the user, the interactive media guidance application may determine whether the gain for the voice command is different from the threshold gain. If the gain for the voice command is different from the threshold gain, the interactive media guidance application may execute the voice command.

In some aspects, the interactive media guidance application may receive the signature sound sequence at multiple microphones connected to the user device. In some embodiments, the multiple microphones are present in the user device, a remote control for the user device, a television connected to the user device, or another suitable device. When the microphones connected to the user device receive the signature sound sequence, the interactive media guidance application may determine a threshold differential gain across the microphones for the current location of the user device. For example, in the case of two microphones, the interactive media guidance application may determine the threshold differential gain based on the difference between the gains of the two microphones. When the microphones connected to the user device receive a voice command from the user, the interactive media guidance application may determine whether the differential gain for the voice command across the microphones is different from the threshold differential gain. If the differential gain for the voice command is different from the threshold differential gain, the interactive media guidance application may execute the voice command.

In an illustrative example, a user device, such as a television, may include a speaker and two unidirectional microphones. The interactive media guidance application may receive a first input and a second input corresponding to the signature sound sequence being received at the same time at the first unidirectional microphone and the second unidirectional microphone. The interactive media guidance application may determine a threshold differential gain (or threshold gain) across the microphones for the current location of the user device. The interactive media guidance application may determine the first gain of the first input to be 91 dB and the second gain of the second input to be 97 dB. The interactive media guidance application may determine and store in memory a first reference gain as the average of the first and second gains, i.e., 94 dB. The interactive media guidance application may normalize the first gain and the second gain against the first reference gain and obtain a normalized first gain of 0.97 and a normalized second gain of 1.03. The interactive media guidance application may determine and store in memory the threshold gain to be the difference between the normalized first gain and the normalized second gain, i.e., −0.06.

Subsequent to storing the first reference gain and the threshold gain for the current location of the user device, the interactive media guidance application may receive a third input and a fourth input corresponding to a voice command being received at the same time at the first unidirectional microphone and the second unidirectional microphone. The interactive media guidance application may determine the third gain of the third input to be 84 dB and the fourth gain of the fourth input to be 76 dB. The interactive media guidance application may determine a second reference gain as the average of the third and fourth gains, i.e., 80 dB. The interactive media guidance application may normalize the third gain and the fourth gain against the second reference gain and obtain a normalized third gain of 1.05 and a normalized second gain of 0.95. The interactive media guidance application may determine the difference between the normalized third gain and the normalized fourth gain, i.e., 0.1. The interactive media guidance application may determine the difference between the normalized third gain and the normalized fourth gain, i.e., 0.1, to be different from the threshold gain, i.e., −0.06. Accordingly, the interactive media guidance application may execute the voice command.

In some embodiments, the interactive media guidance application executing the voice command by determining, using the control circuitry of the user device, a domain of the voice command. The interactive media guidance application further determines, using the control circuitry of the user device, a target device for the voice command based on the domain. The interactive media guidance application further executes, using the control circuitry of the user device, the voice command with respect to the target device. In an illustrative example, the interactive media guidance application interprets a domain for valid voice commands from the user in the context of one or more previous voice commands. When in a television control mode based on a previous television-related command, the phrase "Off" may turn off the television. When in a lighting control mode based on a previous lighting-related command, the phrase "off" may turn off the light.

In some embodiments, the interactive media guidance application uses a signal processing algorithm to filter out false commands. For example, the interactive media guidance application may utilize the algorithm to perform pattern recognition and filter out voices of known radio and television personalities. For example, the interactive media guidance application may previously analyze NPR host Terry Gross's voice pattern and store the voice pattern on a remote database. If the interactive media guidance application receives a voice command that matches the voice pattern of Terry Gross, the interactive media guidance application may determine the voice command to be false and ignore the voice command. In another example, the interactive media guidance application analyzes voice profiles of frequent users and stores them in a database, locally or remotely. When the interactive media guidance application determines that a voice command fails to match a voice profile of a frequent user, the interactive media guidance application treats the voice command as false and ignores it.

In some embodiments, the interactive media guidance application works in conjunction with a remote server that scans in real-time a collection of common live broadcasts, e.g., television, radio, and cable feed. The interactive media guidance application treats voice commands that match the sounds from the live broadcasts as false voice commands.

In some embodiments, the interactive media guidance application alters the sounds being output from the user device or a suitable speaker connected to the user device by embedding a signature sound sequence, e.g., a short burst of low or high frequency sound that is inaudible to human ears. When the interactive media guidance application receives the signature sound sequence, the interactive media guidance application determines that the voice command is false and not a command from a human user.

In some embodiments, the interactive media guidance application generates a conformational query, e.g., "is that really you?" The interactive media guidance application therefore receives another voice command confirming that it is indeed the user providing the voice command.

In some embodiments, the interactive media guidance application is unable to determine whether a detected voice command is a valid voice command from the user. In this case, the interactive media guidance application may delay executing the voice command and continue to receive audio until the interactive media guidance application determines that the voice command is a valid command, e.g., having a level of confidence higher than a threshold. The interactive media guidance application may increase confidence level by asking the user to repeat the voice command. Alternatively or additionally, the interactive media guidance application may generate for display suggested interpretations of the voice command and request confirmation of one of the suggested interpretations from the user.

In some embodiments, the interactive media guidance application receives audio information from an array of microphones. The interactive media guidance application may locate where audio is coming from using the array of microphones. The interactive media guidance application may identify noise based on a noise template, e.g., noise floor, and filter out the noise. For example, directional microphones may be used to determine that noises from certain directions are from a television or a radio.

In some embodiments, the interactive media guidance application may detect whether a user is present in proximity of the user device based on a camera, a smart lock, a smart phone, or another suitable device connected to the user device. If the user is detected in proximity of the user device, the interactive media guidance application may use this information as confirmation of a valid voice command.

In some embodiments, the interactive media guidance application receives data from an integrated camera in the user device for detecting whether one or more persons are present in the room to provide voice commands. If no one is in the room, the interactive media guidance application may treat any received voice commands as false commands. In some embodiments, the interactive media guidance application receives data from a webcam. The webcam may monitor activity within a room. The interactive media guidance application may transmit the data received from the webcam to an image recognition system. The image recognition system may analyze the received data to determine the location or the origin of the voice command. The image recognition system may transmit the determined location to the interactive media guidance application.

In some embodiments, the interactive media guidance application receives image information from one or more cameras and/or one or more light sensors integrated in a computing device, e.g., a mobile phone. The interactive media guidance application may determine the location of a user device, e.g., a television, relative to the computing device based on the image information captured from the cameras and/or light sensors. Subsequently, when the computing device receives a voice command, the computing device may rely on the integrated cameras and/or light sensors to determine whether the voice command was received from the same direction as the detected user device. If the voice command is determined to have been received from the same direction as the user device, the interactive media guidance application may ignore the voice command and treat it as a false voice command.

In some embodiments, the interactive media guidance application applies parental control restrictions based on voice command detection. The interactive media guidance application may create a fingerprint for a single user's voice so that they may only access the system. The interactive media guidance application may lock out a baby's voice, other people's voices, and other voices such that only the fingerprinted person's voice is allowed to use the system.

In some embodiments, the interactive media guidance application authenticates entry of parental control restrictions via voice commands based on the voice fingerprints of authorized users.

In some embodiments, the interactive media guidance application blocks inappropriate content when the interactive media guidance application detects an inappropriate word or phrase from the television speaker.

In some embodiments, the interactive media guidance application provide recommendations based on audio content received from the television speaker.

In some embodiments, the interactive media guidance application detects a security passphrase in the voice command before executing the voice command. For example, the user may speak a security passphrase, such as "tango tango," before issuing a command, such as "tango tango, turn off TV." The interactive media guidance application may confirm the identity of the user based on the security passphrase.

In some embodiments, the interactive media guidance application receives audio information from microphones connected to multiple user devices. The interactive media guidance application may determine that, if the same or similar sounds are received at the microphones of the multiple user devices, the sounds may be public noise, a television broadcast, or another non-user sound that should be registered as a false voice command.

In some embodiments, where a user is not able to enter a room where a user device with a voice recognition interface is located, the interactive media guidance application being executed on the user device allows the user to interact with the interactive media guidance application using a makeshift remote control. For example, the user may wish to control the user device from another room. The user may have gone to bed in the other room and forgotten to turn off the user device. Alternatively or additionally, the user may attempt to prank another user in the room where the user device is located. The user may wish to turn off the user device and have the user in the room also go to bed. The interactive media guidance application may allow the user to specify certain sounds, such as tones, rings, or other suitable sounds, and their frequency as possible inputs to enact particular functions, e.g., turning off the user device. For example, the interactive media guidance application may receive two rings from a phone in the room and recognize that input as a voice command to turn off the user device. The user in the other room may turn off the user device by calling the phone in the room from their cellphone and letting it ring two times.

In some embodiments, the interactive media guidance application creates a fingerprint for the user's voice as transmitted over the phone so that only they may access the system. This fingerprint may be different than the fingerprint created if the user was in the room. In some embodiments, the interactive media guidance application providing this functionality serves a makeshift security function. For example, while away from home, the user may call the phone in the room each night to turn on the user device. This may deter any thieves approaching to enter the user's home by implying that the user is home and viewing content on the user device.

In some aspects, the described systems and methods provide for a method for distinguishing valid voice commands from false voice commands in an interactive media guidance application. The interactive media guidance application receives, at a user device, a signature sound sequence. The interactive media guidance application determines, using control circuitry, based on the signature sound sequence, a threshold gain for the current location of the user device. The interactive media guidance application receives, at the user device, a voice command. The interactive media guidance application determines, using the control circuitry, based on the voice command, a gain for the voice command. The interactive media guidance application determines, using the control circuitry, whether the gain for the voice command is different from the threshold gain. Based on determining that the gain for the voice command is different from the threshold gain, the interactive media guidance application executes, using the control circuitry, the voice command.

In some aspects, the described systems and methods provide for a method for distinguishing valid voice commands from false voice commands in an interactive media guidance application. The interactive media guidance application receives, at a first unidirectional microphone of a user device, a first input including a signature sound sequence at a first time. The interactive media guidance application receives, at a second unidirectional microphone of the user device, a second input including the signature sound sequence at the first time. The interactive media guidance application determines, using control circuitry of the user device, a first gain of the first input. The interactive media guidance application determines, using the control circuitry of the user device, a second gain of the second input.

The interactive media guidance application determines, using the control circuitry of the user device, a first reference gain including an average of the first and second gains. The interactive media guidance application stores, in memory of the user device, the first reference gain for a current location of the user device. The interactive media guidance application normalizes, using the control circuitry of the user device, the first gain against the first reference gain. The interactive media guidance application normalizes, using the control circuitry of the user device, the second gain against the first reference gain. The interactive media guidance application determines, using the control circuitry of the user device, a threshold gain including a difference between the normalized first and second gains. The interactive media guidance application stores, in the memory of the user device, the threshold gain for the current location of the user device.

Subsequent to storing, in the memory of the user device, the first reference gain and the threshold gain for the current location of the user device, the interactive media guidance application receives, at the first unidirectional microphone of the user device, a third input including a voice command at a second time. The interactive media guidance application receives, at the second unidirectional microphone of the user device, a fourth input including the voice command at the second time. The interactive media guidance application determines, using the control circuitry of the user device, a third gain of the third input and a fourth gain of the fourth input.

The interactive media guidance application determines, using the control circuitry of the user device, a second reference gain including an average of the third and fourth gains. The interactive media guidance application normalizes, using the control circuitry of the user device, the third and fourth gains against the second reference gain. The interactive media guidance application determines, using the control circuitry of the user device, a difference between the normalized third and fourth gains.

The interactive media guidance application retrieves, from the memory of the user device, the threshold gain for the current location of the user device. The interactive media guidance application determines, using the control circuitry of the user device, whether the difference between the normalized third and fourth gains is different from the threshold gain. Based on determining that the difference between the normalized third and fourth gains is different from the threshold gain, the interactive media guidance application executes, using the control circuitry of the user device, the voice command.

In some embodiments, the interactive media guidance application determines the first gain of the first input by receiving, from the first unidirectional microphone of the user device, a first input voltage corresponding to the first input. The interactive media guidance application further retrieves, from the memory of the user device, a first reference voltage for the first unidirectional microphone. The interactive media guidance application calculates, using the control circuitry of the user device, the first gain according to equation:

$$\text{the first gain} = 20 \, x \log\left(\frac{\text{the first input voltage}}{\text{the first reference voltage}}\right).$$

The interactive media guidance application further stores, in the memory of the user device, the first gain.

In some embodiments, the interactive media guidance application determines the second gain of the second input by receiving, from the second unidirectional microphone of the user device, a second input voltage corresponding to the second input. The interactive media guidance application further retrieves, from the memory of the user device, a second reference voltage for the second unidirectional microphone. The interactive media guidance application further calculates, using the control circuitry of the user device, the second gain according to equation:

$$\text{the second gain} = 20 \, x \log\left(\frac{\text{the second input voltage}}{\text{the second reference voltage}}\right).$$

The interactive media guidance application further stores, in the memory of the user device, the second gain.

In some embodiments, the interactive media guidance application normalizes the first gain against the first reference gain by retrieving, from the memory of the user device, the first gain. The interactive media guidance application divides, using the control circuitry of the user device, the first gain by the first reference gain to determine the normalized first gain. The interactive media guidance application stores, in the memory of the user device, the normalized first gain.

In some embodiments, the interactive media guidance application normalizes the second gain against the first reference gain by retrieving, from the memory of the user device, the second gain. The interactive media guidance application further divides, using the control circuitry of the user device, the second gain by the first reference gain to determine the normalized second gain. The interactive media guidance application stores, in the memory of the user device, the normalized second gain.

In some embodiments, the first and second inputs including the signature sound sequence are received at the first time during a setup procedure for the user device.

In some embodiments, the first and second inputs including the signature sound sequence are received at the first time and periodically thereafter during operation for the user device.

In some embodiments, based on determining that the difference between the normalized third and fourth gains is not different from the threshold gain, the interactive media guidance application delays execution of the voice command for a particular period of time.

In some embodiments, the interactive media guidance application generates, using the control circuitry of the user device, a query requesting confirmation from a user of the user device. The interactive media guidance application receives, at the user device, the requested confirmation from the user. Based on receiving the requested confirmation from the user, the interactive media guidance application executes, using the control circuitry of the user device, the voice command.

In some embodiments, the interactive media guidance application executing the voice command by determining, using the control circuitry of the user device, a domain of the voice command. The interactive media guidance application further determines, using the control circuitry of the user device, a target device for the voice command based on the domain. The interactive media guidance application further executes, using the control circuitry of the user device, the voice command with respect to the target device.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for distinguishing valid voice commands from false voice commands in an interactive media guidance application. In some aspects, the interactive media guidance application receives, at a user device, a signature sound sequence. The interactive media guidance application determines, using control circuitry, based on the signature sound sequence, a threshold gain for the current location of the user device. The interactive media guidance application receives, at the user device, a voice command. The interactive media guidance application determines, using the control circuitry, based on the voice command, a gain for the voice command. The interactive media guidance application determines, using the control circuitry, whether the gain for the voice command is different from the threshold gain. Based on determining that the gain for the voice command is different from the threshold gain, the interactive media guidance application executes, using the control circuitry, the voice command.

Figure 7:
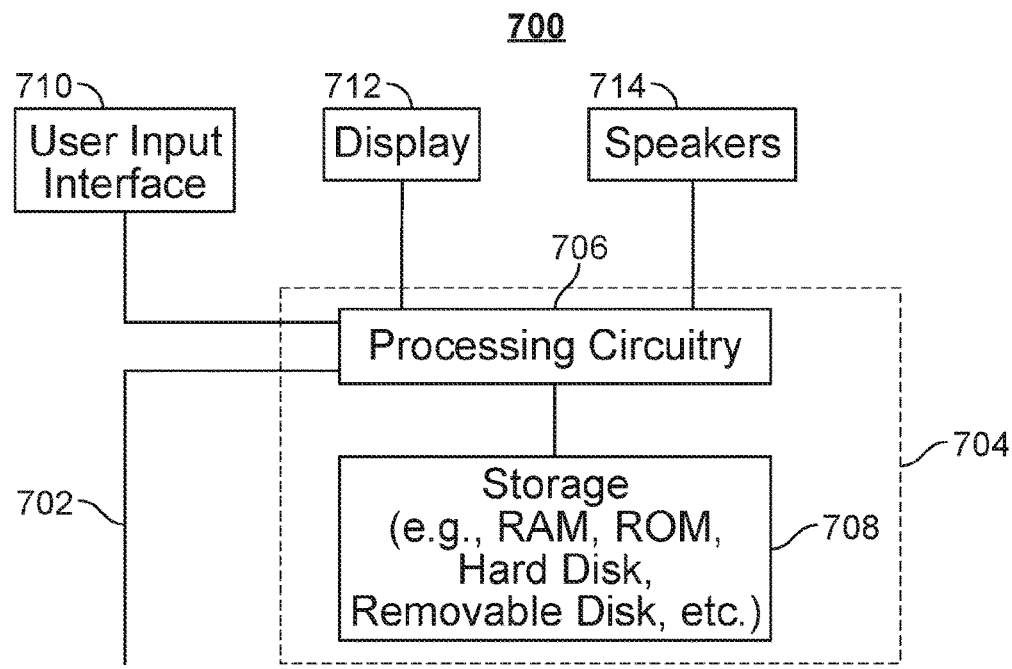
FIG. 7 is a block diagram of an illustrative user equipment device in accordance with some embodiments of the disclosure.

The described systems and methods address shortcomings in conventional systems, such as user devices with voice recognition interfaces. Conventional systems are sometimes unable to distinguish between valid voice commands received from the user and false voice commands received from another source, e.g., a speaker connected to the user device. The systems and methods described herein provide for an interactive media guidance application that can distinguish between valid voice commands and false voice commands. The interactive media guidance application may be executed on control circuitry, e.g., control circuitry 704 of user equipment device 700 (FIG. 7). The interactive media guidance application may determine a threshold metric based on a signature sound sequence played through a speaker or another suitable device connected to the user device, e.g., speakers 714 of user equipment device 700 (FIG. 7). The threshold metric may be an indication of a false voice command generated from the speaker of the user device.

On receiving a voice command, the interactive media guidance application may determine another metric for the voice command and compare the determined metric to the threshold metric. If the metrics are determined to be the same or close in value (e.g., within a certain threshold), the interactive media guidance application may determine the voice command to be a false voice command generated from the speaker at the current location of the user device. If the metrics are determined to be different (e.g., differing by more than a certain threshold), the interactive media guidance application may determine the voice command to be a valid voice command received from a user, e.g., a voice command input by the user via user input interface 710 (FIG. 7). This is because the metrics being different may be an indication of a valid voice command received from a location other than the speaker of the user device.

In some aspects, the interactive media guidance application may generate a signature sound sequence for playback on, e.g., speakers 714 of user equipment device 700 (FIG. 7). For example, the signature sound sequence may be outside the audible frequency for human ears, i.e., below 20 Hz or above 20 KHz. In some embodiments, the signature sound sequence is generated during a setup sequence. In some embodiments, the signature sound sequence is generated periodically during operation of the user device. When a microphone connected to the user device, e.g., user input interface 710 (FIG. 7), receives the signature sound sequence, the interactive media guidance application may determine a threshold gain for the current location of the user device based on the gain of the microphone. When the microphone connected to the user device receives a voice command from the user, the interactive media guidance application may determine whether the gain for the voice command is different from the threshold gain. If the gain for the voice command is different from the threshold gain, the interactive media guidance application may execute the voice command.

Figure 1:
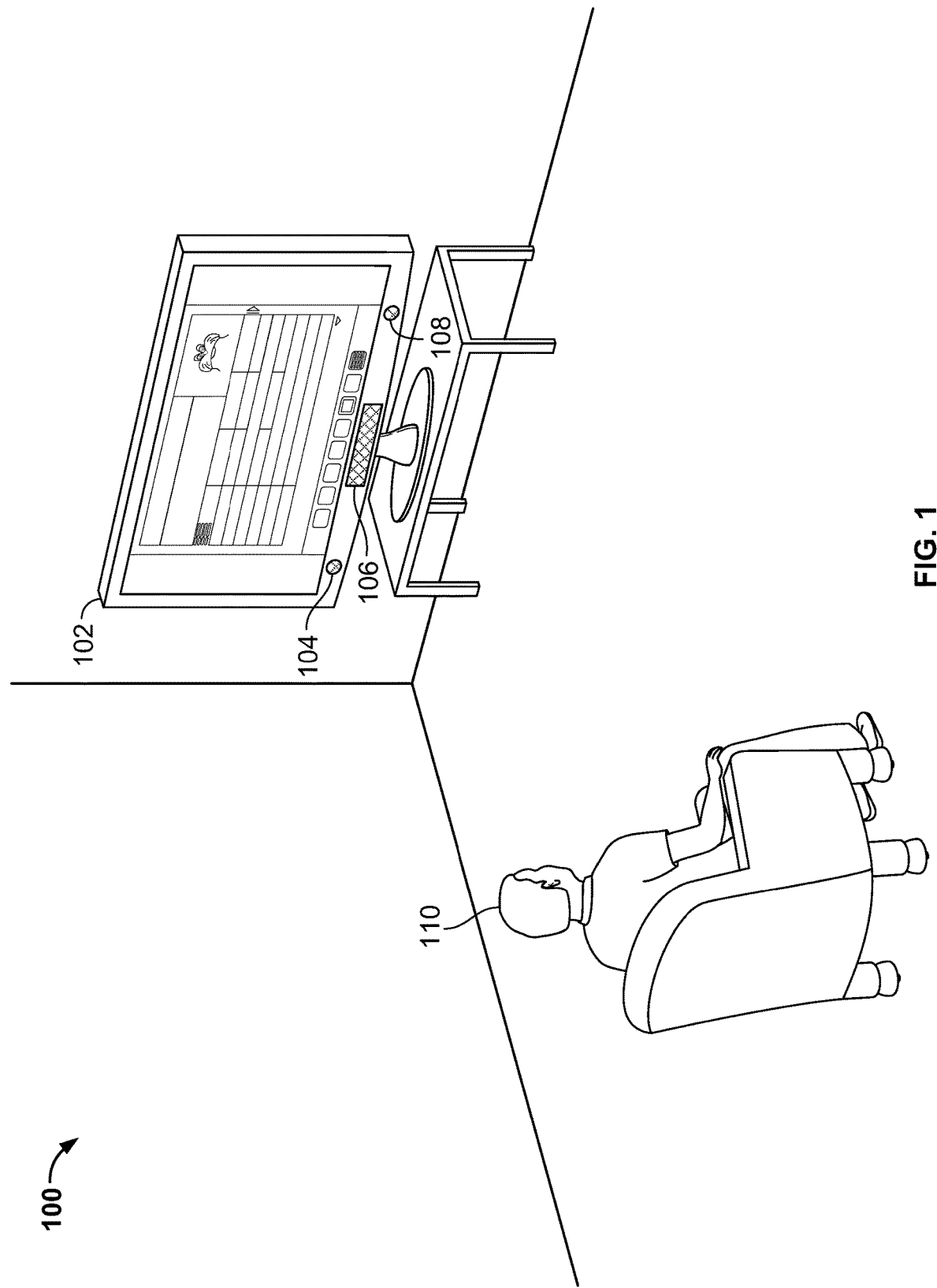
FIG. 1 shows an illustrative example of an interactive media guidance application implemented on a user device for distinguishing valid voice commands from false voice commands in accordance with some embodiments of the disclosure.

FIGS. 1-4 show illustrative examples of an interactive media guidance application implemented on a user device for distinguishing valid voice commands from false voice commands. FIG. 1 shows illustrative example 100 of an interactive media guidance application implemented on user device 102. User device 102 includes integrated unidirectional microphones 104 and 108 and speaker 106. User 110 may issue voice commands to user device 102.

Figure 2:
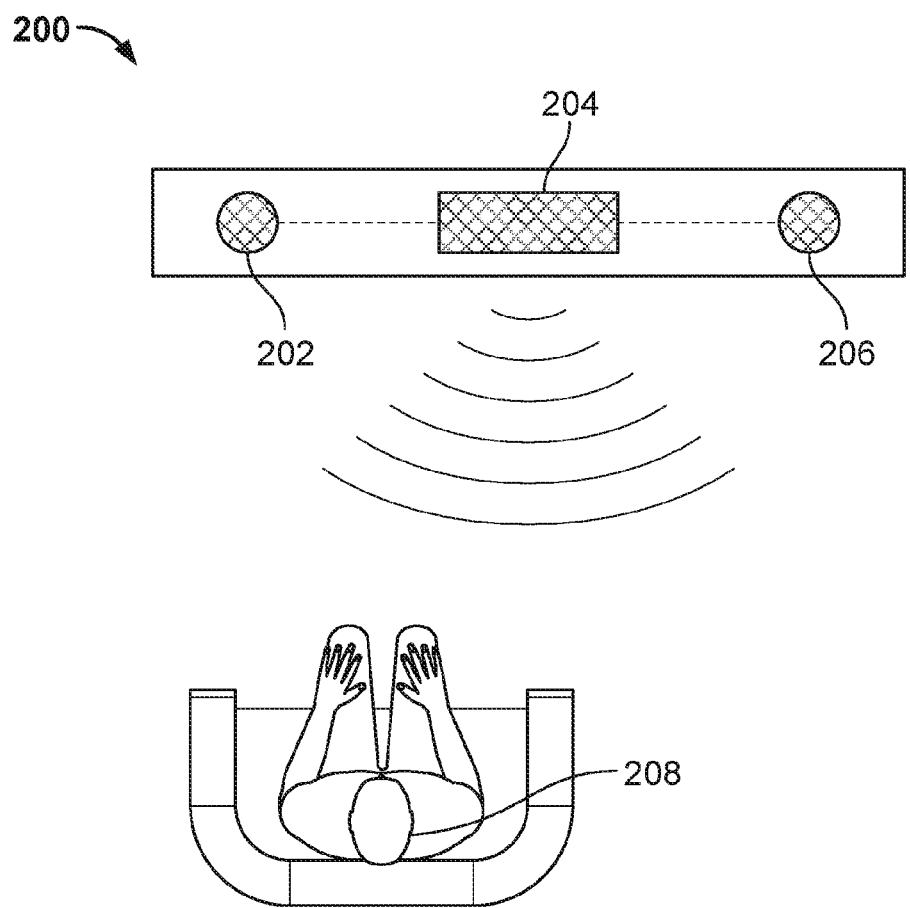
FIG. 2 shows another illustrative example of an interactive media guidance application implemented on a user device for distinguishing valid voice commands from false voice commands in accordance with some embodiments of the disclosure.

FIG. 2 shows an illustrative example of the interactive media guidance application processing a signature sound sequence as described above. The interactive media guidance application on user device 200 receives the signature sound sequence from speaker 204 at microphones 202 and 206. User 208 is located at an appropriate distance from user device 200. When microphones 202 and 206 receive the signature sound sequence, the interactive media guidance application may determine a threshold differential gain across microphones 202 and 206 for the current location of user device 200. For example, the interactive media guidance application may determine the threshold differential gain based on the difference between the gains of the microphones 202 and 206.

Figure 3:
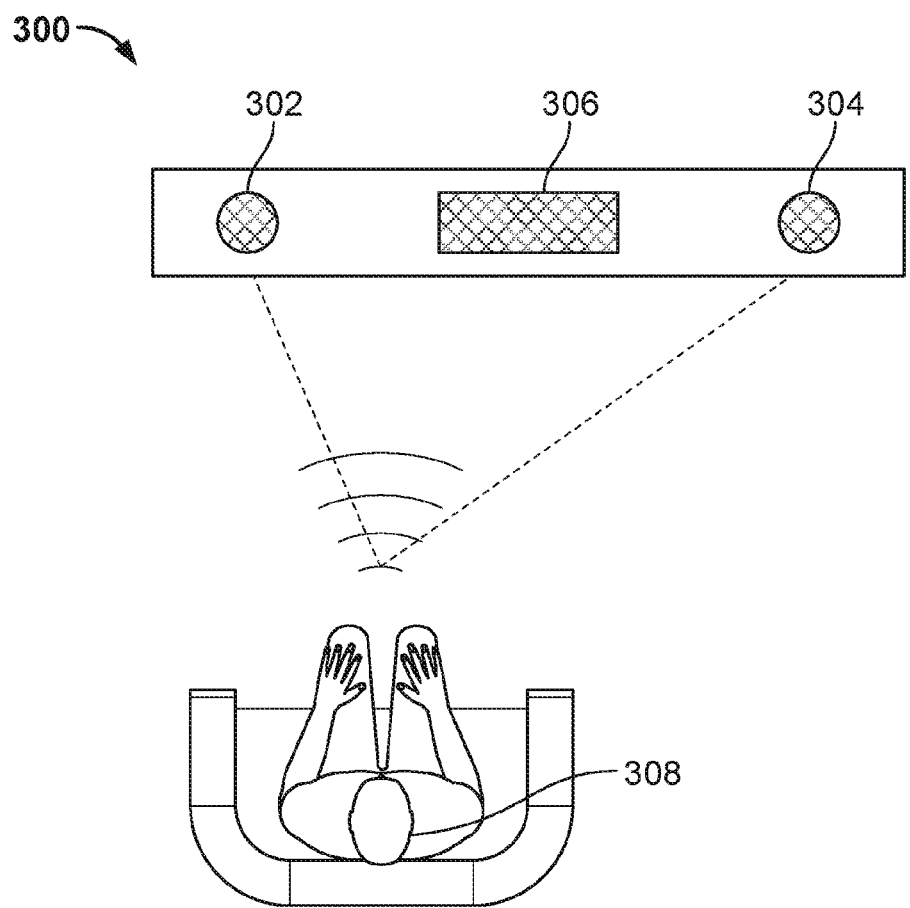
FIG. 3 shows yet another illustrative example of an interactive media guidance application implemented on a user device for distinguishing valid voice commands from false voice commands in accordance with some embodiments of the disclosure.

FIG. 3 shows an illustrative example of the interactive media guidance application processing a voice command from the user as described above. User device 300 includes speaker 304 and microphones 302 and 306. When microphones 302 and 306 receive a voice command from user 308, the interactive media guidance application determines whether the differential gain for the voice command across microphones 302 and 306 is different from the threshold differential gain. If the differential gain for the voice command is different from the threshold differential gain, the interactive media guidance application executes the voice command from the user.

In the illustrative example with respect to FIGS. 1-3, the user device, such as a television, includes a speaker and two unidirectional microphones. The interactive media guidance application may receive a first input and a second input corresponding to the signature sound sequence being received at the same time at the first unidirectional microphone and the second unidirectional microphone. The interactive media guidance application may determine a threshold differential gain (or threshold gain) across the microphones for the current location of the user device. The interactive media guidance application may determine the first gain of the first input to be 91 dB and the second gain of the second input to be 97 dB. The interactive media guidance application may determine and store in memory, e.g., storage 708 (FIG. 7), a first reference gain as the average of the first and second gains, i.e., 94 dB. The interactive media guidance application may normalize the first gain and the second gain against the first reference gain and obtain a normalized first gain of 0.97 and a normalized second gain of 1.03. The interactive media guidance application may determine and store in memory, e.g., storage 708 (FIG. 7), the threshold gain to be the difference between the normalized first gain and the normalized second gain, i.e., −0.06.

Subsequent to storing the first reference gain and the threshold gain for the current location of the user device, the interactive media guidance application may receive a third input and a fourth input corresponding to a voice command being received at the same time at the first unidirectional microphone and the second unidirectional microphone. The interactive media guidance application may determine the third gain of the third input to be 84 dB and the fourth gain of the fourth input to be 76 dB. The interactive media guidance application may determine a second reference gain as the average of the third and fourth gains, i.e., 80 dB. The interactive media guidance application may normalize the third gain and the fourth gain against the second reference gain and obtain a normalized third gain of 1.05 and a normalized second gain of 0.95. The interactive media guidance application may determine the difference between the normalized third gain and the normalized fourth gain, i.e., 0.1. The interactive media guidance application may determine the difference between the normalized third gain and the normalized fourth gain, i.e., 0.1, to be different from the threshold gain, i.e., −0.06. Accordingly, the interactive media guidance application may execute the voice command.

In some embodiments, the interactive media guidance application executing the voice command by determining, using the control circuitry of the user device, a domain of the voice command. The interactive media guidance application further determines, using the control circuitry of the user device, a target device for the voice command based on the domain. The interactive media guidance application further executes, using the control circuitry of the user device, the voice command with respect to the target device. In an illustrative example, the interactive media guidance application interprets a domain for valid voice commands from the user in the context of one or more previous voice commands. When in a television control mode based on a previous television-related command, the phrase "Off" may turn off the television. When in a lighting control mode based on a previous lighting-related command, the phrase "off" may turn off the light.

Figure 4:
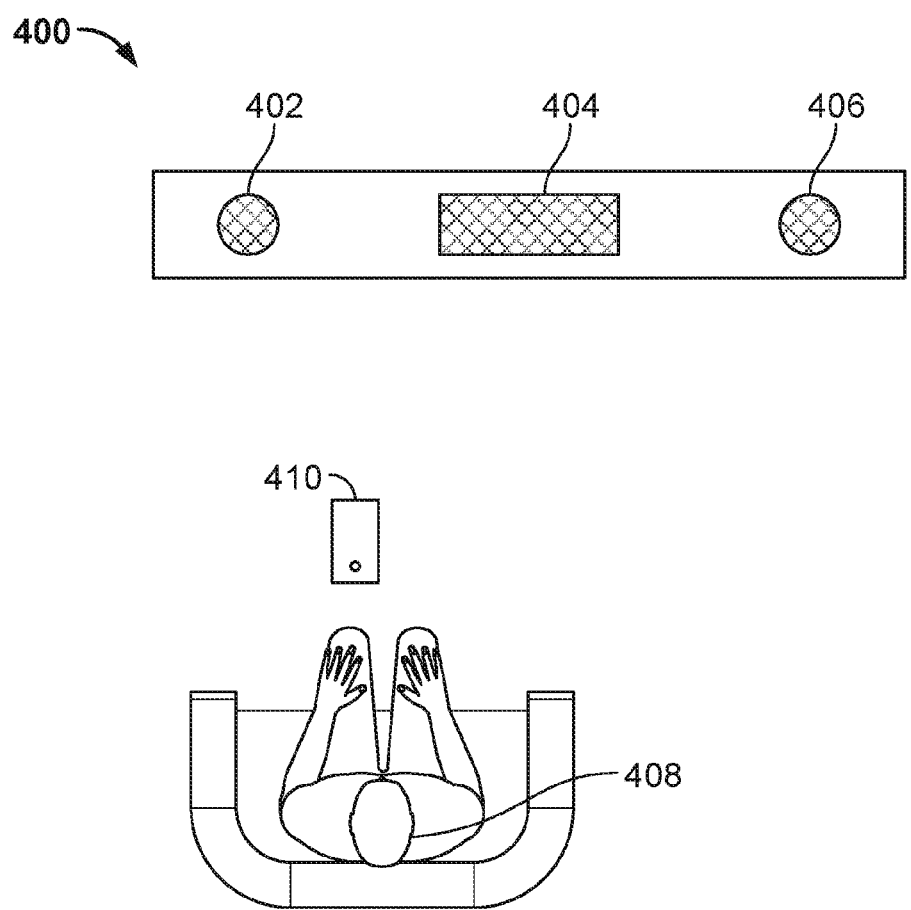
FIG. 4 shows yet another illustrative example of an interactive media guidance application implemented on a user device for distinguishing valid voice commands from false voice commands in accordance with some embodiments of the disclosure.

In some embodiments, the multiple microphones are present in the user device, a remote control for the user device, a television connected to the user device, or another suitable device. FIG. 4 illustrates an interactive media guidance application implemented on user device 400. User device 400 includes integrated microphones 402 and 406 and speaker 404. Mobile device 410, e.g., a smartphone belonging to user 408, includes another microphone. When the user issues a voice command, the interactive media guidance application may receive audio data from microphones 402, 406, and 410 and process the audio data in a similar manner as described above with respect to FIGS. 1-3. In this example, the interactive media guidance application may triangulate the audio data from the three microphones to determine a threshold gain corresponding to the current location of user device 400.

In some embodiments, the interactive media guidance application uses a signal processing algorithm to filter out false commands. For example, the interactive media guidance application may utilize the algorithm to perform pattern recognition and filter out voices of known radio and television personalities. For example, the interactive media guidance application may previously analyze NPR host Terry Gross's voice pattern and store the voice pattern on a remote database. If the interactive media guidance application receives a voice command that matches the voice pattern of Terry Gross, the interactive media guidance application may determine the voice command to be false and ignore the voice command. In another example, the interactive media guidance application analyzes voice profiles of frequent users and stores them in a database, locally or remotely. When the interactive media guidance application determines that a voice command fails to match a voice profile of a frequent user, the interactive media guidance application treats the voice command as false and ignores it.

In some embodiments, the interactive media guidance application works in conjunction with a remote server that scans in real-time a collection of common live broadcasts, e.g., television, radio, and cable feed. The interactive media guidance application treats voice commands that match the sounds from the live broadcasts as false voice commands.

In some embodiments, the interactive media guidance application alters the sounds being output from the user device or a suitable speaker connected to the user device by embedding a signature sound sequence, e.g., a short burst of low or high frequency sound that is inaudible to human ears. When the interactive media guidance application receives the signature sound sequence, the interactive media guidance application determines that the voice command is false and not a command from a human user.

In some embodiments, the interactive media guidance application generates a conformational query, e.g., "is that really you?" The interactive media guidance application therefore receives another voice command confirming that it is indeed the user providing the voice command.

In some embodiments, the interactive media guidance application is unable to determine whether a detected voice command is a valid voice command from the user. In this case, the interactive media guidance application may delay executing the voice command and continue to receive audio until the interactive media guidance application determines that the voice command is a valid command, e.g., having a level of confidence higher than a threshold. The interactive media guidance application may increase confidence level by asking the user to repeat the voice command. Alternatively or additionally, the interactive media guidance application may generate for display suggested interpretations of the voice command and request confirmation of one of the suggested interpretations from the user.

In some embodiments, the interactive media guidance application receives audio information from an array of microphones. The interactive media guidance application may locate where audio is coming from using the array of microphones. The interactive media guidance application may identify noise based on a noise template, e.g., noise floor, and filter out the noise. For example, directional microphones may be used to determine that noises from certain directions are from a television or a radio.

In some embodiments, the interactive media guidance application may detect whether a user is present in proximity of the user device based on a camera, a smart lock, a smart phone, or another suitable device connected to the user device. If the user is detected in proximity of the user device, the interactive media guidance application may use this information as confirmation of a valid voice command.

In some embodiments, the interactive media guidance application receives data from an integrated camera in the user device for detecting whether one or more persons are present in the room to provide voice commands. If no one is in the room, the interactive media guidance application may treat any received voice commands as false commands. In some embodiments, the interactive media guidance application receives data from a webcam. The webcam may monitor activity within a room. The interactive media guidance application may transmit the data received from the webcam to an image recognition system. The image recognition system may analyze the received data to determine the location or the origin of the voice command. The image recognition system may transmit the determined location to the interactive media guidance application.

In some embodiments, the interactive media guidance application receives image information from one or more cameras and/or one or more light sensors integrated in a computing device, e.g., a mobile phone. The interactive media guidance application may determine the location of a user device, e.g., a television, relative to the computing device based on the image information captured from the cameras and/or light sensors. Subsequently, when the computing device receives a voice command, the computing device may rely on the integrated cameras and/or light sensors to determine whether the voice command was received from the same direction as the detected user device. If the voice command is determined to have been received from the same direction as the user device, the interactive media guidance application may ignore the voice command and treat it as a false voice command.

In some embodiments, the interactive media guidance application applies parental control restrictions based on voice command detection. The interactive media guidance application may create a fingerprint for a single user's voice so that they may only access the system. The interactive media guidance application may lock out a baby's voice, other people's voices, and other voices such that only the fingerprinted person's voice is allowed to use the system.

In some embodiments, the interactive media guidance application authenticates entry of parental control restrictions via voice commands based on the voice fingerprints of authorized users.

In some embodiments, the interactive media guidance application blocks inappropriate content when the interactive media guidance application detects an inappropriate word or phrase from the television speaker.

In some embodiments, the interactive media guidance application provide recommendations based on audio content received from the television speaker.

In some embodiments, the interactive media guidance application detects a security passphrase in the voice command before executing the voice command. For example, the user may speak a security passphrase, such as "tango tango," before issuing a command, such as "tango tango, turn off TV." The interactive media guidance application may confirm the identity of the user based on the security passphrase.

In some embodiments, the interactive media guidance application receives audio information from microphones connected to multiple user devices. The interactive media guidance application may determine that, if the same or similar sounds are received at the microphones of the multiple user devices, the sounds may be public noise, a television broadcast, or another non-user sound that should be registered as a false voice command.

In some embodiments, where a user is not able to enter a room where a user device with a voice recognition interface is located, the interactive media guidance application being executed on the user device allows the user to interact with the interactive media guidance application using a makeshift remote control. For example, the user may wish to control the user device from another room. The user may have gone to bed in the other room and forgotten to turn off the user device. Alternatively or additionally, the user may attempt to prank another user in the room where the user device is located. The user may wish to turn off the user device and have the user in the room also go to bed. The interactive media guidance application may allow the user to specify certain sounds, such as tones, rings, or other suitable sounds, and their frequency as possible inputs to enact particular functions, e.g., turning off the user device. For example, the interactive media guidance application may receive two rings from a phone in the room and recognize that input as a voice command to turn off the user device. The user in the other room may turn off the user device by calling the phone in the room from their cellphone and letting it ring two times.

In some embodiments, the interactive media guidance application creates a fingerprint for the user's voice as transmitted over the phone so that only they may access the system. This fingerprint may be different than the fingerprint created if the user was in the room. In some embodiments, the interactive media guidance application providing this functionality serves a makeshift security function. For example, while away from home, the user may call the phone in the room each night to turn on the user device. This may deter any thieves approaching to enter the user's home by implying that the user is home and viewing content on the user device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
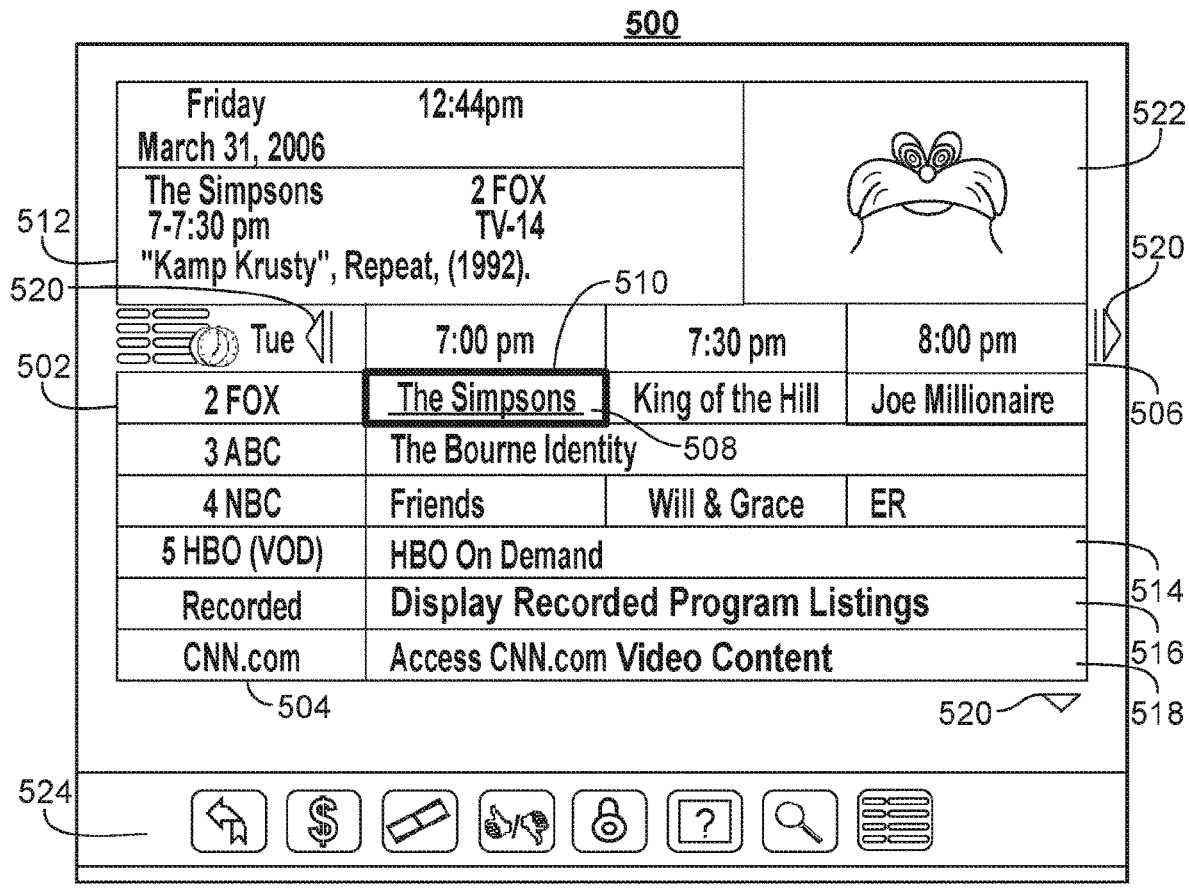
FIG. 5 shows yet an illustrative example of a display screen generated by a media guidance application in accordance with some embodiments of the disclosure.
Figure 6:
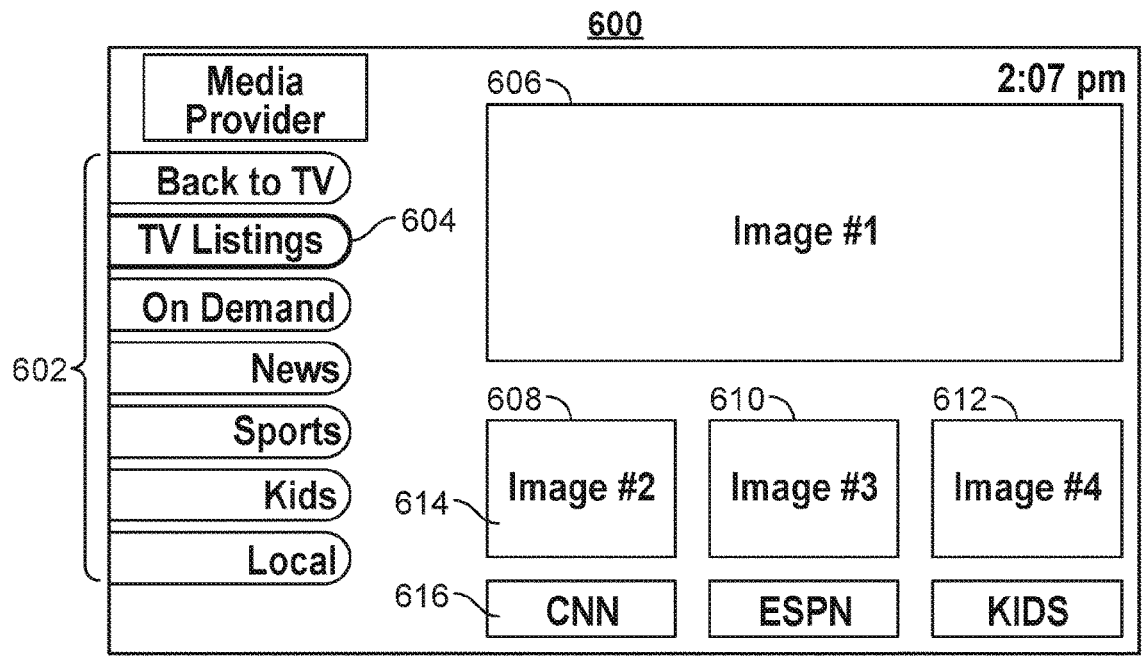
FIG. 6 shows another illustrative example of a display screen generated by a media guidance application in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
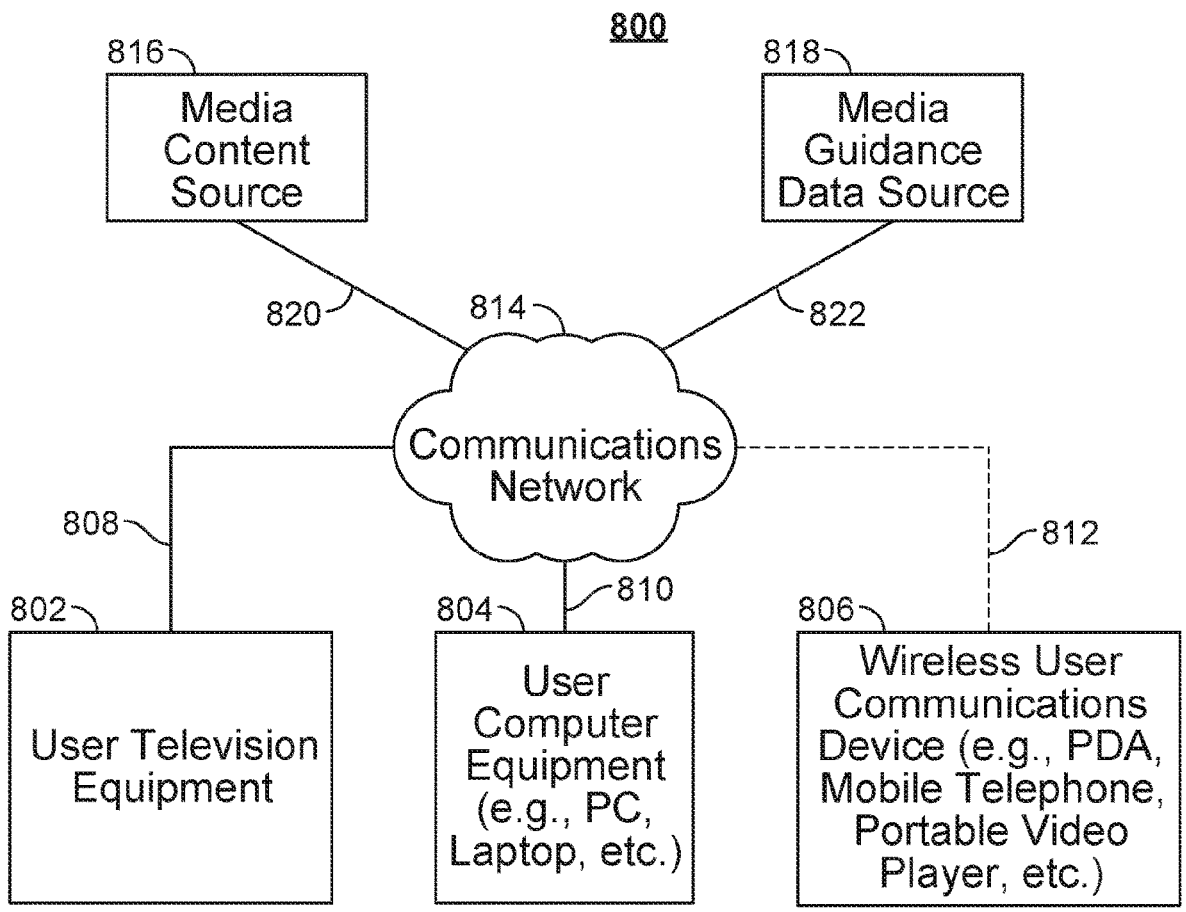
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
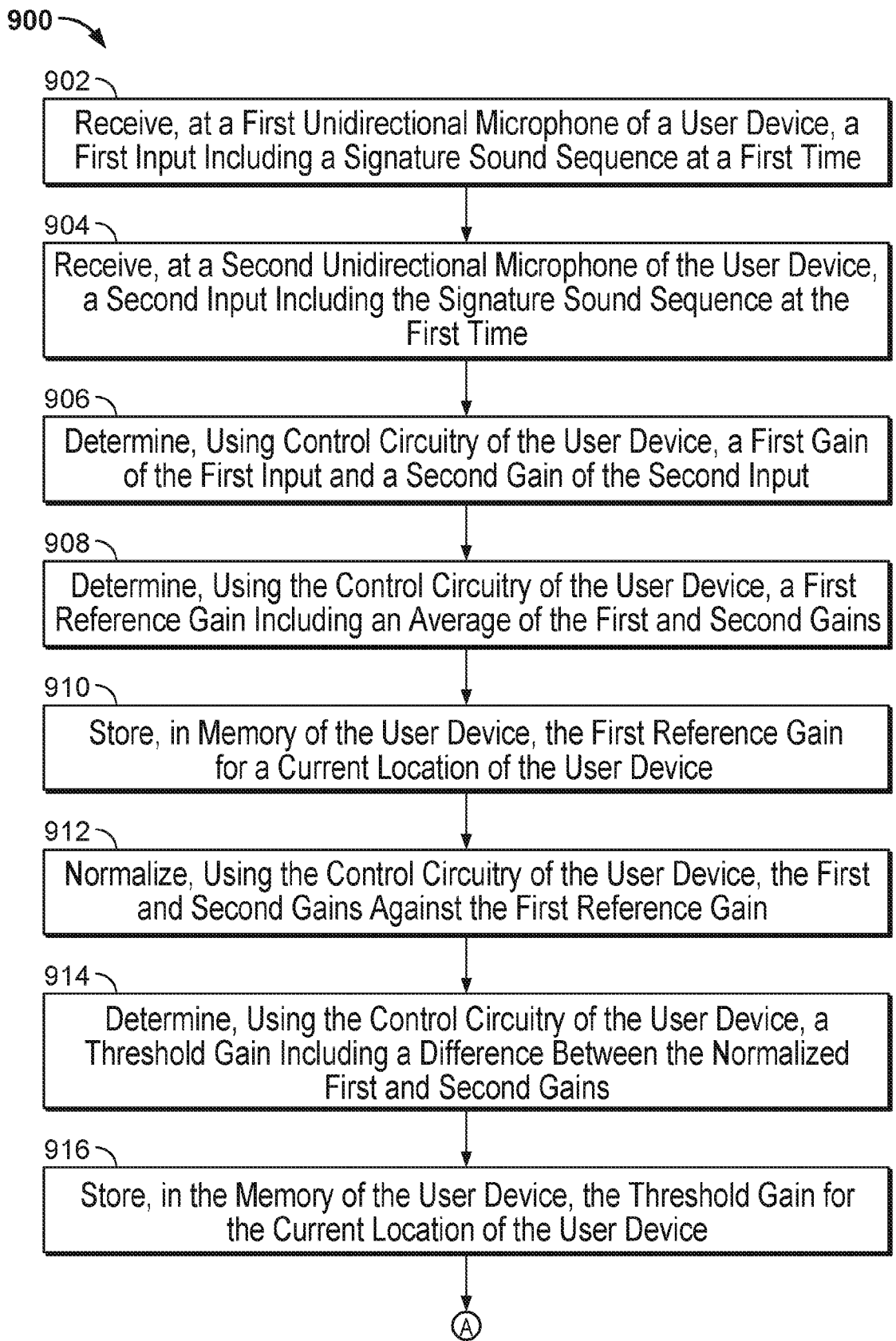
FIGS. 9-10 are flowcharts of an illustrative process for distinguishing valid voice commands from false voice commands in accordance with some embodiments of the disclosure.
Figure 10:
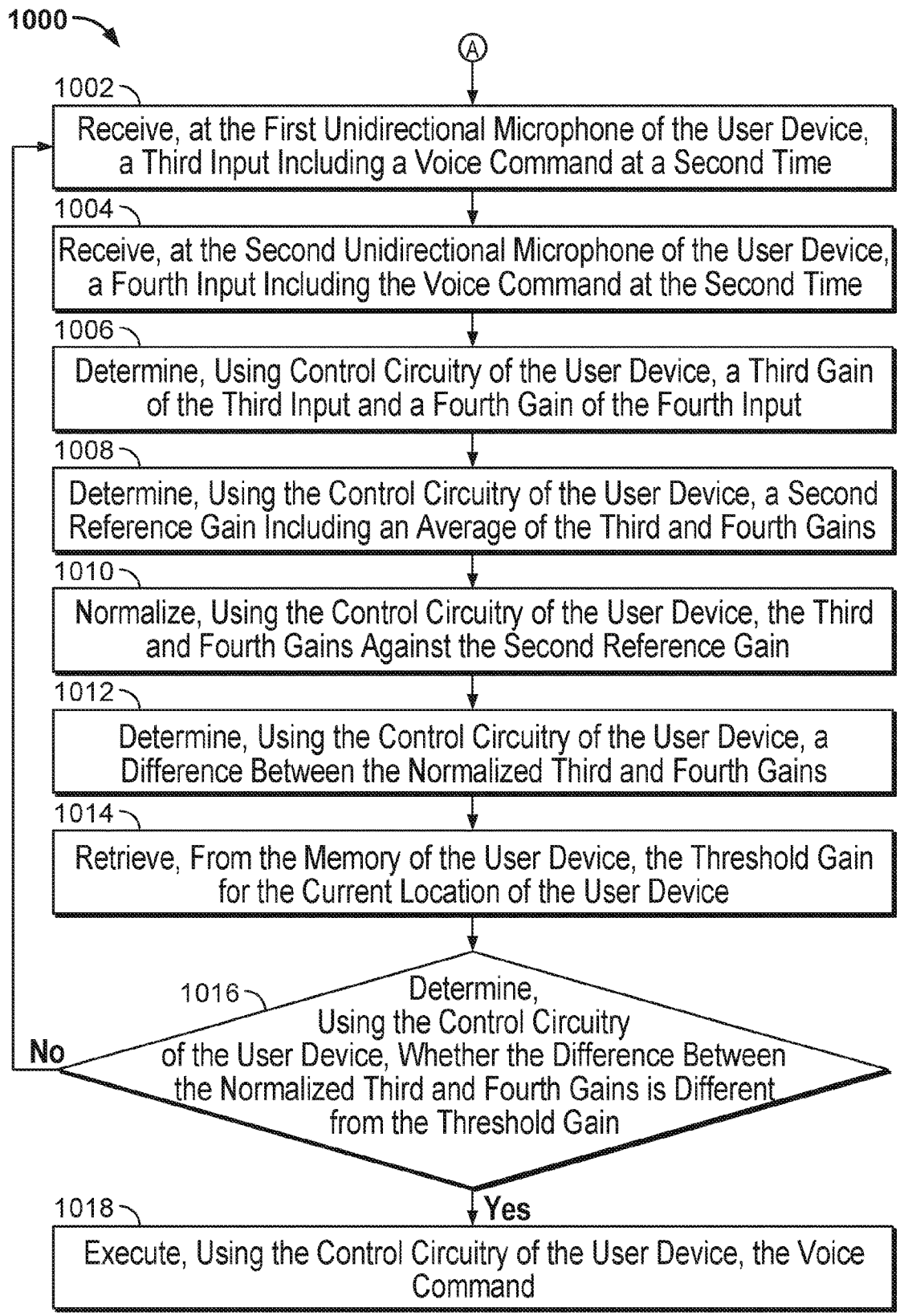

FIGS. 9-10 are flowcharts of illustrative processes 900 and 1000 for an interactive media guidance application implemented on control circuitry (e.g., control circuitry 704, FIG. 7) of a user device (e.g., user equipment device 700, FIG. 7) to distinguish valid voice commands from false voice commands in accordance with some embodiments of the disclosure. In some embodiments, these algorithms may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 902, the interactive media guidance application implemented on control circuitry (e.g., control circuitry 704, FIG. 7) receives, at a first unidirectional microphone of a user device, a first input including a signature sound sequence at a first time.

At step 904, the interactive media guidance application implemented on control circuitry (e.g., control circuitry 704, FIG. 7) receives, at a second unidirectional microphone of the user device, a second input including the signature sound sequence at the first time.

For example, a user device, such as user device 102 (FIG. 1), may include a speaker and two unidirectional microphones. The interactive media guidance application may receive a first input and a second input corresponding to the signature sound sequence being received at the same time at the first unidirectional microphone and the second unidirectional microphone. In some embodiments, the first and second inputs including the signature sound sequence are received at the first time during a setup procedure for the user device. In some embodiments, the first and second inputs including the signature sound sequence are received at the first time and periodically thereafter during operation for the user device.

At step 906, the interactive media guidance application implemented on control circuitry (e.g., control circuitry 704, FIG. 7) determines, using control circuitry of the user device, a first gain of the first input and a second gain of the second input. For example, the interactive media guidance application may determine the first gain of the first input to be 91 dB and the second gain of the second input to be 97 dB.

At step 908, the interactive media guidance application implemented on control circuitry (e.g., control circuitry 704, FIG. 7) determines a first reference gain including an average of the first and second gains. For example, the interactive media guidance application may determine a first reference gain as the average of the first and second gains, i.e., 94 dB.

At step 910, the interactive media guidance application implemented on control circuitry (e.g., control circuitry 704, FIG. 7) stores, in memory of the user device, the first reference gain for a current location of the user device. For example, the interactive media guidance application may store in memory, e.g., storage 708 (FIG. 7), the first reference gain for the current location of the user device, i.e., 94 dB.

At step 912, the interactive media guidance application implemented on control circuitry (e.g., control circuitry 704, FIG. 7) normalizes the first gain against the first reference gain and the second gain against the first reference gain. For example, the interactive media guidance application may normalize the first gain and the second gain against the first reference gain and obtain a normalized first gain of 0.97 and a normalized second gain of 1.03.

At step 914, the interactive media guidance application implemented on control circuitry (e.g., control circuitry 704, FIG. 7) determines a threshold gain including a difference between the normalized first and second gains. For example, the interactive media guidance application may determine the threshold gain to be the difference between the normalized first gain and the normalized second gain, i.e., −0.06.

At step 916, the interactive media guidance application implemented on control circuitry (e.g., control circuitry 704, FIG. 7) stores, in the memory of the user device, the threshold gain for the current location of the user device. For example, the interactive media guidance application may store in memory, e.g., storage 708 (FIG. 7), the threshold gain for the current location of the user device, i.e., −0.06.

Subsequent to storing, in the memory of the user device, the first reference gain and the threshold gain for the current location of the user device, at step 1002, the interactive media guidance application implemented on control circuitry (e.g., control circuitry 704, FIG. 7) receives, at the first unidirectional microphone of the user device, a third input including a voice command at a second time.

At step 1004, the interactive media guidance application implemented on control circuitry (e.g., control circuitry 704, FIG. 7) receives, at the second unidirectional microphone of the user device, a fourth input including the voice command at the second time.

For example, the interactive media guidance application may receive a third input and a fourth input corresponding to a voice command being received at the same time at the first unidirectional microphone and the second unidirectional microphone.

At step 1006, the interactive media guidance application implemented on control circuitry (e.g., control circuitry 704, FIG. 7) determines a third gain of the third input and a fourth gain of the fourth input. For example, the interactive media guidance application may determine the third gain of the third input to be 84 dB and the fourth gain of the fourth input to be 76 dB.

At step 1008, the interactive media guidance application implemented on control circuitry (e.g., control circuitry 704, FIG. 7) determines a second reference gain including an average of the third and fourth gains. For example, the interactive media guidance application may determine a second reference gain as the average of the third and fourth gains, i.e., 80 dB.

At step 1010, the interactive media guidance application implemented on control circuitry (e.g., control circuitry 704, FIG. 7) normalizes the third and fourth gains against the second reference gain. For example, the interactive media guidance application may normalize the third gain and the fourth gain against the second reference gain and obtain a normalized third gain of 1.05 and a normalized second gain of 0.95.

At step 1012, the interactive media guidance application implemented on control circuitry (e.g., control circuitry 704, FIG. 7) determines a difference between the normalized third and fourth gains. For example, the interactive media guidance application may determine the difference between the normalized third gain and the normalized fourth gain, i.e., 0.1.

At step 1014, the interactive media guidance application implemented on control circuitry (e.g., control circuitry 704, FIG. 7) retrieves, from the memory of the user device, the threshold gain for the current location of the user device. For example, the interactive media guidance application may retrieve from memory, e.g., storage 708 (FIG. 7), the threshold gain for the current location of the user device, i.e., −0.06.

At step 1016, the interactive media guidance application implemented on control circuitry (e.g., control circuitry 704, FIG. 7) determines whether the difference between the normalized third and fourth gains is different from the threshold gain. For example, the interactive media guidance application may determine the difference between the normalized third gain and the normalized fourth gain, i.e., 0.1, to be different from the threshold gain, i.e., −0.06.

Based on determining that the difference between the normalized third and fourth gains is different from the threshold gain, at step 1018, the interactive media guidance application implemented on control circuitry (e.g., control circuitry 704, FIG. 7) executes the voice command.

In some embodiments, the interactive media guidance application executing the voice command by determining a domain of the voice command. The interactive media guidance application further determines a target device for the voice command based on the domain. The interactive media guidance application further executes the voice command with respect to the target device. In an illustrative example, the interactive media guidance application interprets a domain for valid voice commands from the user in the context of one or more previous voice commands. When in a television control mode based on a previous television-related command, the phrase "Off" may turn off the television. When in a lighting control mode based on a previous lighting-related command, the phrase "off" may turn off the light.

Based on determining that the difference between the normalized third and fourth gains is not different from the threshold gain, the interactive media guidance application implemented on control circuitry (e.g., control circuitry 704, FIG. 7) returns to step 1002. In some embodiments, the interactive media guidance application delays execution of the voice command for a particular period of time. In some embodiments, the interactive media guidance application generates a query requesting confirmation from a user of the user device. The interactive media guidance application receives, at the user device, the requested confirmation from the user. Based on receiving the requested confirmation from the user, the interactive media guidance application executes the voice command.

It is contemplated that the steps or descriptions of FIGS. 9-10 may be used with any other embodiment of this disclosure. In addition, the descriptions described in relation to the algorithms of FIGS. 9-10 may be done in alternative orders or in parallel to further the purposes of this disclosure. For example, conditional statements and logical evaluations, such as those at 1016, may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 9-10 may be implemented on a combination of appropriately configured software and hardware, and that any of the devices or equipment discussed in relation to FIGS. 7-8 could be used to implement one or more portions of the process.

Figure 11:
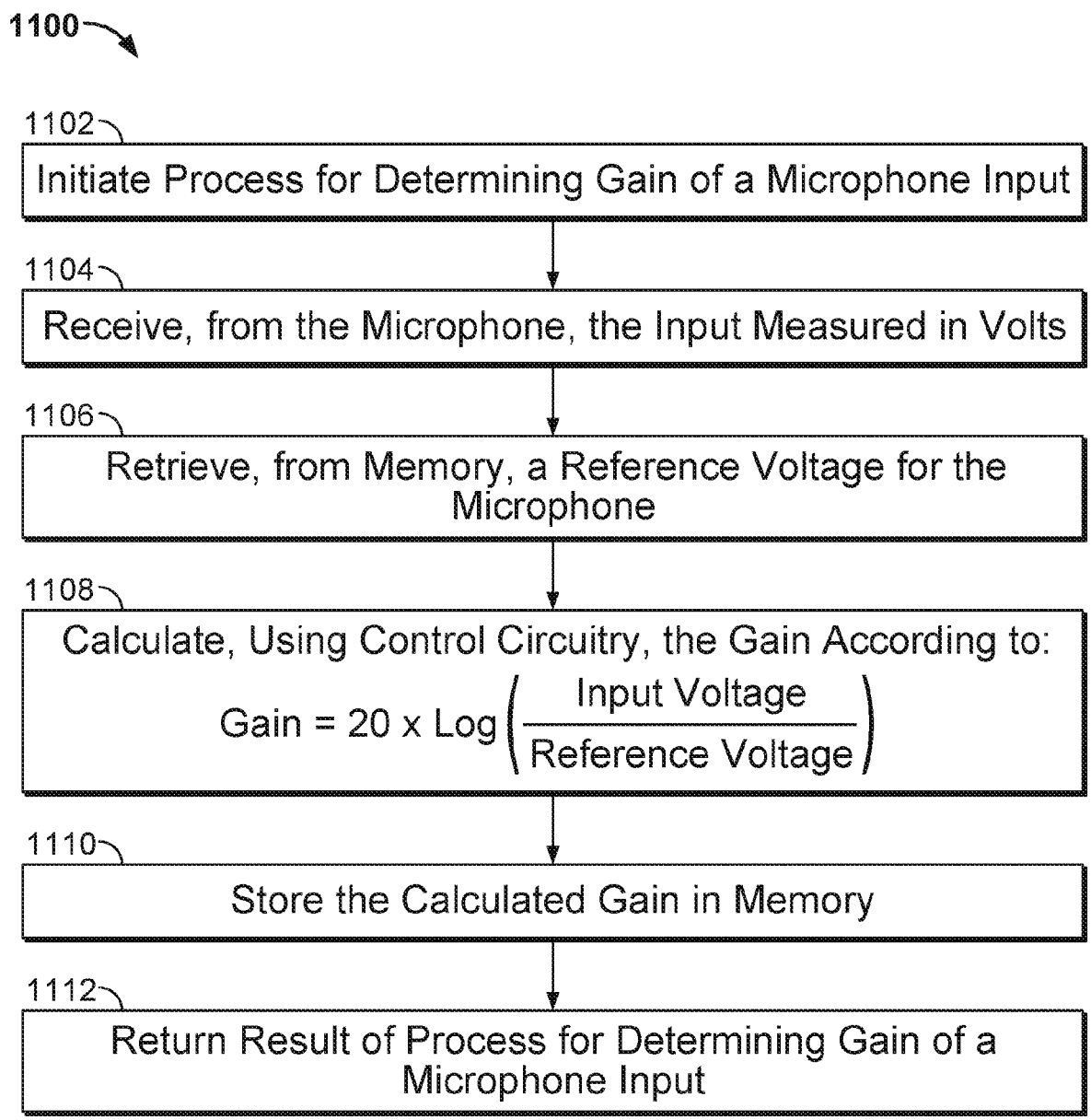
FIG. 11 is a flowchart of an illustrative process for determining gain of a microphone input in accordance with some embodiments of the disclosure.

FIG. 11 is a flowchart of illustrative process 1100 for an interactive media guidance application implemented on control circuitry (e.g., control circuitry 704, FIG. 7) of a user device (e.g., user equipment device 700, FIG. 7) to determine gain of a microphone input in accordance with some embodiments of the disclosure. Process 1100 provides an illustrative process for executing step 906 (FIG. 9) or step 1006 (FIG. 10). In some embodiments, this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1102, the interactive media guidance application implemented on control circuitry (e.g., control circuitry 704, FIG. 7) initiates the process for determining gain of a microphone input.

At step 1104, the interactive media guidance application implemented on control circuitry (e.g., control circuitry 704, FIG. 7) receives, from the microphone, e.g., user input interface 710 (FIG. 7), an input voltage corresponding to the input.

At step 1106, the interactive media guidance application implemented on control circuitry (e.g., control circuitry 704, FIG. 7) retrieves, from the memory, e.g., storage 708 (FIG. 7), a reference voltage for the microphone. In some embodiments, the interactive media guidance application determines the reference voltage of the microphone. The interactive media guidance application retrieves information regarding the microphone sensitivity from memory. This information is a key specification that is typically available in the manufacturer datasheet for the microphone. Microphone sensitivity is the ratio of the reference voltage to the input pressure. Microphone sensitivity is typically measured with a 1 kHz sine wave at a 94 dB sound pressure level or 1 Pa (Pascal) pressure. The magnitude of the reference voltage from the microphone with that input pressure is a measure of its sensitivity. The magnitude of the reference voltage may be determined by mapping units in the acoustic domain to units in the electrical domain. For example, a microphone having sensitivity of −46 dBV/Pa corresponds to a reference voltage of 0.005V.

At step 1108, the interactive media guidance application implemented on control circuitry (e.g., control circuitry 704, FIG. 7) calculates, using the control circuitry of the user device, the first gain according to equation:

$$\text{gain} = 20 \, x \log\left(\frac{\text{input voltage}}{\text{reference voltage}}\right).$$

For example, for an input voltage of 5V and a reference voltage of 0.005V, the interactive media guidance application may calculate the gain as shown below:

$$\text{gain} = 20 \, x \log\left(\frac{5 \text{ V}}{0.005 \text{ V}}\right) = 60 \text{ dB}.$$

In some embodiments, another suitable calculation may be performed to determine the gain of the input based on the input voltage and the reference voltage of the microphone.

At step 1110, the interactive media guidance application implemented on control circuitry (e.g., control circuitry 704, FIG. 7) stores, in the memory of the user device, e.g., storage 708 (FIG. 7), the first gain.

At step 1112, the interactive media guidance application implemented on control circuitry (e.g., control circuitry 704, FIG. 7) returns the result of process 1200 to the appropriate process 900 or 1000.

In one example, the interactive media guidance application determines the first gain of the first input by receiving, from the first unidirectional microphone of the user device, a first input voltage corresponding to the first input. The interactive media guidance application further retrieves, from the memory of the user device, a first reference voltage for the first unidirectional microphone. The interactive media guidance application calculates, using the control circuitry of the user device, the first gain according to equation:

$$\text{the first gain} = 20 \, x \log\left(\frac{\text{the first input voltage}}{\text{the first reference voltage}}\right).$$

The interactive media guidance application further stores, in the memory of the user device, the first gain.

In another example, the interactive media guidance application determines the second gain of the second input by receiving, from the second unidirectional microphone of the user device, a second input voltage corresponding to the second input. The interactive media guidance application further retrieves, from the memory of the user device, a second reference voltage for the second unidirectional microphone. The interactive media guidance application further calculates, using the control circuitry of the user device, the second gain according to equation:

$$\text{the second gain} = 20 \times \log\left(\frac{\text{the second input voltage}}{\text{the second reference voltage}}\right).$$

The interactive media guidance application further stores, in the memory of the user device, the second gain.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 7-8 could be used to implement one or more portions of the process.

Figure 12:
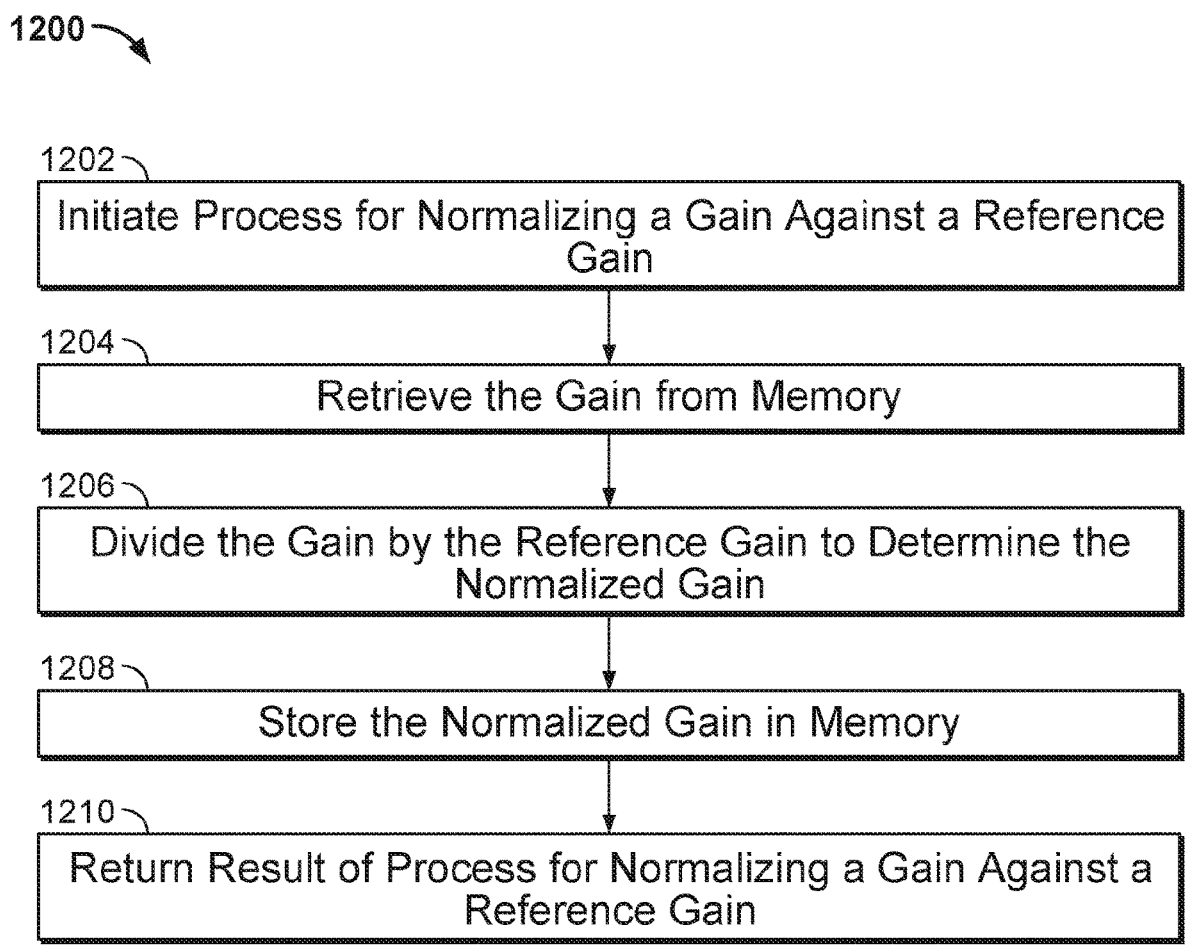
FIG. 12 is a flowchart of an illustrative process for normalizing a gain against a reference gain in accordance with some embodiments of the disclosure.

FIG. 12 is a flowchart of illustrative process 1200 for an interactive media guidance application implemented on control circuitry (e.g., control circuitry 704, FIG. 7) of a user device (e.g., user equipment device 700, FIG. 7) to normalize a gain against a reference gain in accordance with some embodiments of the disclosure. Process 1200 provides an illustrative process for executing step 912 (FIG. 9) or step 1010 (FIG. 10). In some embodiments, this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1202, the interactive media guidance application implemented on control circuitry (e.g., control circuitry 704, FIG. 7) initiates the process for normalizing a gain against a reference gain.

At step 1204, the interactive media guidance application implemented on control circuitry (e.g., control circuitry 704, FIG. 7) retrieves the gain from memory, e.g., storage 708 (FIG. 7).

At step 1206, the interactive media guidance application implemented on control circuitry (e.g., control circuitry 704, FIG. 7) divides the gain by the corresponding reference gain to determine the normalized gain. In some embodiments, the interactive media guidance application performs another operation or another set of operations on the gain with respect to the corresponding reference gain to determine the normalized gain. In a non-limiting example, the interactive media guidance application may divide the gain by the reference gain and take the absolute value of the result to determine the normalized gain.

At step 1208, the interactive media guidance application implemented on control circuitry (e.g., control circuitry 704, FIG. 7) stores the normalized gain in memory, e.g., storage 708 (FIG. 7).

At step 1210, the interactive media guidance application implemented on control circuitry (e.g., control circuitry 704, FIG. 7) returns the result of process 1200 to the appropriate process 900 or 1000.

In one example, the interactive media guidance application normalizes the first gain against the first reference gain by retrieving, from the memory of the user device, the first gain. The interactive media guidance application divides, using the control circuitry of the user device, the first gain by the first reference gain to determine the normalized first gain. The interactive media guidance application stores, in the memory of the user device, the normalized first gain.

In another example, the interactive media guidance application normalizes the second gain against the first reference gain by retrieving, from the memory of the user device, the second gain. The interactive media guidance application further divides, using the control circuitry of the user device, the second gain by the first reference gain to determine the normalized second gain. The interactive media guidance application stores, in the memory of the user device, the normalized second gain.

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a user device, a signature sound sequence, wherein the signature sound sequence has a frequency outside audible frequency for humans;
   determining a threshold metric based on the signature sound sequence;
   receiving, at the user device, a voice command;

determining a metric for the voice command;
determining, based on comparing the metric for the voice command to the threshold metric based on the signature sound sequence, that the metric for the voice command is different than the threshold metric; and
causing the voice command to be executed.

2. The method of claim 1, wherein the determining the threshold metric based on the signature sound sequence further comprises:
determining a first gain of the signature sound sequence at a first time;
determining a second gain of the signature sound sequence at a second time;
determining a reference gain by averaging the first gain and the second gain;
normalizing the first gain based on the reference gain and normalizing the second gain based on the reference gain; and
determining the threshold metric based on a difference between the normalized first gain and the normalized second gain.

3. The method of claim 1, wherein the signature sound sequence is received via a unidirectional microphone of the user device.

4. The method of claim 1, wherein the voice command is received via a unidirectional microphone of the user device.

5. The method of claim 1, wherein the signature sound sequence is transmitted by a speaker of the user device.

6. The method of claim 1, further comprising:
determining, based on comparing the metric for the voice command to the threshold metric, that the metric for the voice command is close in value to the threshold metric;
determining that the voice command is a false voice command; and
ignoring the false voice command.

7. The method of claim 6, wherein the false voice command indicates that the voice command is generated from a speaker at a current location of the user device.

8. The method of claim 1, wherein the signature sound sequence and the voice command are received at a first time during a setup procedure for the user device.

9. The method of claim 1, wherein causing the voice command to be executed comprises:
determining a domain of the voice command;
determining a target device for the voice command based on the domain; and
executing the voice command with respect to the target device.

10. A system comprising:
input/output circuitry configured to:
receive, at a user device, a signature sound sequence, wherein the signature sound sequence has a frequency outside audible frequency for humans;
processing circuitry configured to:
determine a threshold metric based on the signature sound sequence;
wherein the input/output circuitry is further configured to:
receive, at the user device, a voice command;
wherein the processing circuitry is further configured to:
determine a metric for the voice command;
determine, based on comparing the metric for the voice command to the threshold metric based on the signature sound sequence, that the metric for the voice command is different than the threshold metric; and
cause the voice command to be executed.

11. The system of claim 10, wherein the processing circuitry is further configured to determine the threshold metric based on the signature sound sequence by:
determining a first gain of the signature sound sequence at a first time;
determining a second gain of the signature sound sequence at a second time;
determining a reference gain by averaging the first gain and the second gain;
normalizing the first gain based on the reference gain and normalizing the second gain based on the reference gain; and
determining the threshold metric based on a difference between the normalized first gain and the normalized second gain.

12. The system of claim 10, wherein the input/output circuitry is further configured to receive the signature sound sequence via a unidirectional microphone of the user device.

13. The system of claim 10, wherein the input/output circuitry is further configured to receive the voice command via a unidirectional microphone of the user device.

14. The system of claim 10, wherein the processing circuitry is further configured to transmit the signature sound sequence by a speaker of the user device.

15. The system of claim 10, wherein the processing circuitry is further configured to:
determine, based on comparing the metric for the voice command to the threshold metric, that the metric for the voice command is close in value to the threshold metric;
determine that the voice command is a false voice command; and
ignore the false voice command.

16. The system of claim 15, wherein the false voice command indicates that the voice command is generated from a speaker at a current location of the user device.

17. The system of claim 10, wherein the input/output circuitry is further configured to receive the signature sound sequence and the voice command at a first time during a setup procedure for the user device.

18. The system of claim 10, wherein causing, by the processing circuitry, the voice command to be executed comprises:
determining a domain of the voice command;
determining a target device for the voice command based on the domain; and
executing the voice command with respect to the target device.

\* \* \* \* \*